(12) United States Patent
Choi et al.

(10) Patent No.: US 9,886,113 B2
(45) Date of Patent: Feb. 6, 2018

(54) DISPLAY DEVICE

(71) Applicant: SAMSUNG DISPLAY CO., LTD., Yongin-si, Gyeonggi-Do (KR)

(72) Inventors: Chung Sock Choi, Seoul (KR); Seung Hun Kim, Hwaseong-si (KR); Seung Yong Song, Suwon-si (KR); Cheol Jang, Uiwang-si (KR); Sang Hwan Cho, Suwon-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/834,670

(22) Filed: Aug. 25, 2015

(65) Prior Publication Data

US 2016/0202817 A1 Jul. 14, 2016

(30) Foreign Application Priority Data

Jan. 14, 2015 (KR) .......... 10-2015-0007004

(51) Int. Cl.
*G06F 3/041* (2006.01)
*G06F 3/044* (2006.01)
*G02F 1/1333* (2006.01)

(52) U.S. Cl.
CPC ........ *G06F 3/0412* (2013.01); *G02F 1/13338* (2013.01)

(58) Field of Classification Search
CPC ... G06F 3/0412; G02F 1/13338; H01L 27/32; H01L 27/323; H01L 51/50; H01L 51/105; H01L 51/442; H01L 51/448; H01L 51/5012; H01L 27/3246; H01L 27/3258; H05B 33/00; H05B 33/04
See application file for complete search history.

(56) References Cited

U.S. PATENT DOCUMENTS

| | | | | |
|---|---|---|---|---|
| 8,743,078 B2* | 6/2014 | Kim | .................. | G06F 3/044 345/174 |
| 2008/0203909 A1* | 8/2008 | Azuma | ............... | H01L 51/5246 313/504 |
| 2013/0049184 A1* | 2/2013 | Kasahara | .............. | H01L 51/525 257/687 |
| 2013/0270580 A1* | 10/2013 | Choi | ..................... | H01L 51/524 257/82 |

FOREIGN PATENT DOCUMENTS

| KR | 10-2008-0090657 A | 10/2008 |
|---|---|---|
| KR | 10-2010-0034436 A | 4/2010 |
| KR | 10-2011-0132875 A | 12/2011 |
| KR | 10-2012-0000133 A | 1/2012 |

* cited by examiner

*Primary Examiner* — Jennifer Mehmood
*Assistant Examiner* — Sardis F Azongha
(74) *Attorney, Agent, or Firm* — Lee & Morse, P.C.

(57) ABSTRACT

A display device including a substrate having a display area including a plurality of pixels and a peripheral area positioned outside the display area, a sealant in the peripheral area, a first spacer on the sealant, an encapsulation substrate on the first spacer, and a touch sensor on the encapsulation substrate facing the display area.

7 Claims, 10 Drawing Sheets

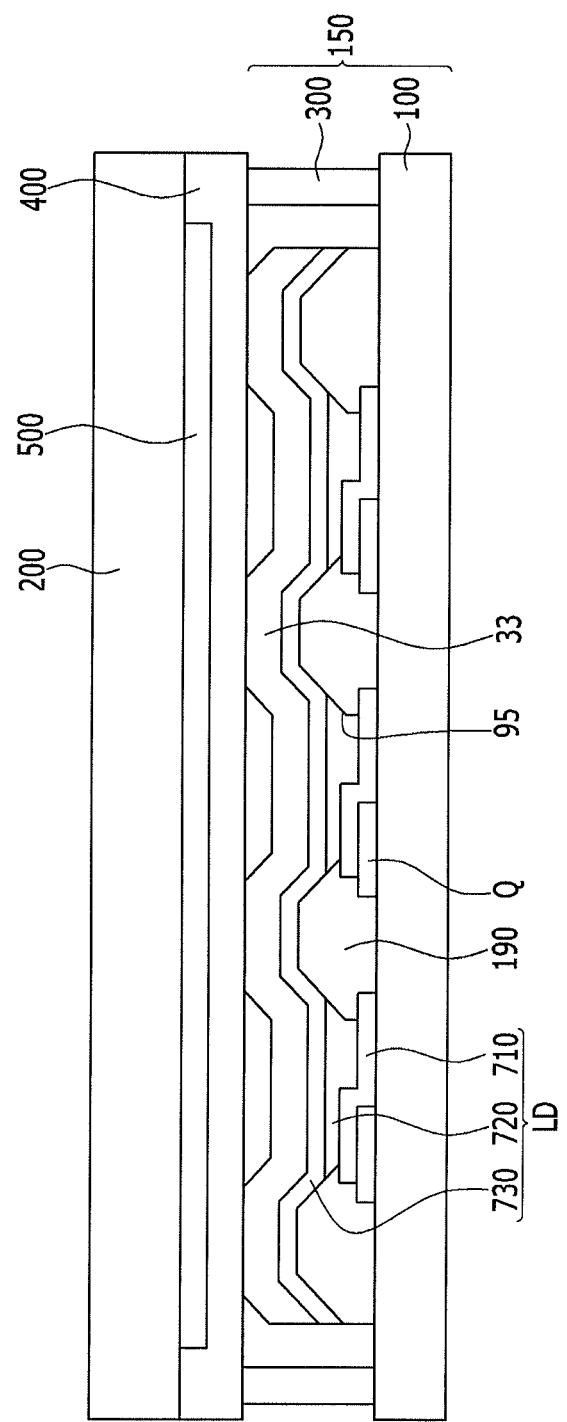

DISPLAY DEVICE

CROSS-REFERENCE TO RELATED APPLICATION

Korean Patent Application No. 10-2015-0007004, filed on Jan. 14, 2015, in the Korean Intellectual Property Office, and entitled: "Display Device," is incorporated by reference herein in its entirety.

BACKGROUND

1. Field

Embodiments relate to a display device, and more particularly, to a display device including a touch sensor.

2. Description of the Related Art

Display devices such as a liquid crystal display and an organic light emitting display, portable transmission devices, and other information processing devices perform a function by using various input devices. Recently, as the input devices, input devices including a touch sensing device have been frequently used.

SUMMARY

Embodiments are directed to a display device including a substrate having a display area including a plurality of pixels and a peripheral area positioned outside the display area, a sealant in the peripheral area, a first spacer on the sealant, an encapsulation substrate on the first spacer, and a touch sensor on the encapsulation substrate facing the display area.

The first spacer may be on the entire substrate.

The first spacer may be made of a transparent insulating material.

The transparent insulating material may include PbO, SnO, $V_2O_5$, $P_2O_5$, BaO, ZnO, $B_2O_3$, or $Bi_2O_3$.

The display device may further include a plurality of second spacers located in the display area.

The pixel may include a transistor, a first electrode connected with the transistor, a pixel defining layer formed on the substrate and having an opening exposing the first electrode, an organic emission layer positioned in the opening, and a second electrode forming on the organic emission layer. The second spacer may be positioned in a region corresponding to the pixel defining layer.

The second spacer may have a column shape.

The pixels may be provided in a matrix form. The second spacer may be provided along at least one of the pixel row and the pixel column to have a linear shape.

The first spacer and the second spacer may be made of a transparent insulating material.

The transparent insulating material may include PbO, SnO, $V_2O_5$, $P_2O_5$, BaO, ZnO, $B_2O_3$ or $Bi_2O_3$.

The touch sensor may be a capacitive type touch sensor.

BRIEF DESCRIPTION OF THE DRAWINGS

Features will become apparent to those of skill in the art by describing in detail exemplary embodiments with reference to the attached drawings in which:

FIG. 10 illustrates a cross-sectional view of FIG. 9 taken along line X-X.

DETAILED DESCRIPTION

Figure 1:
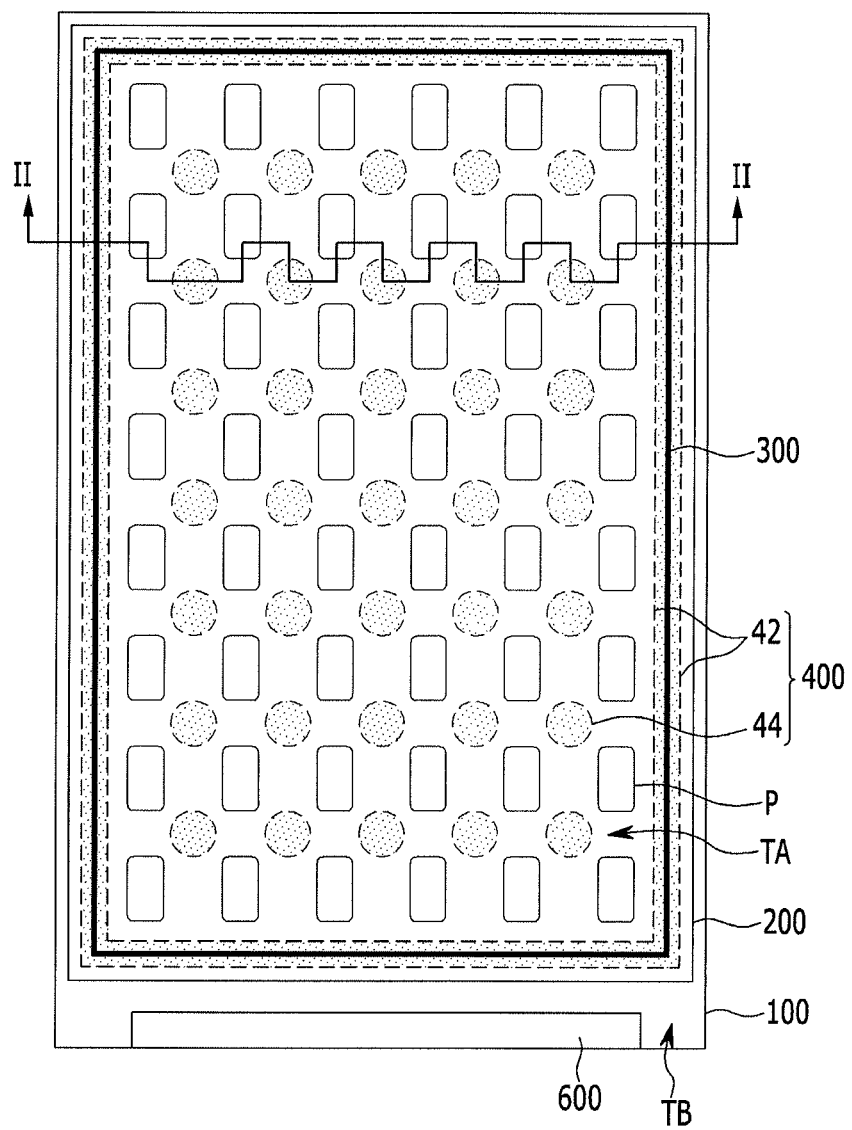
FIG. 1 illustrates a schematic plan view of an organic light emitting display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, the term "on" may refer to positioning on or below an object portion, but does not necessarily refer to positioning on the upper side of the object portion based on a gravity direction. Further, it will be understood that when a layer is referred to as being "between" two layers, it can be the only layer between the two layers, or one or more intervening layers may also be present. Like reference numerals refer to like elements throughout.

Figure 2:
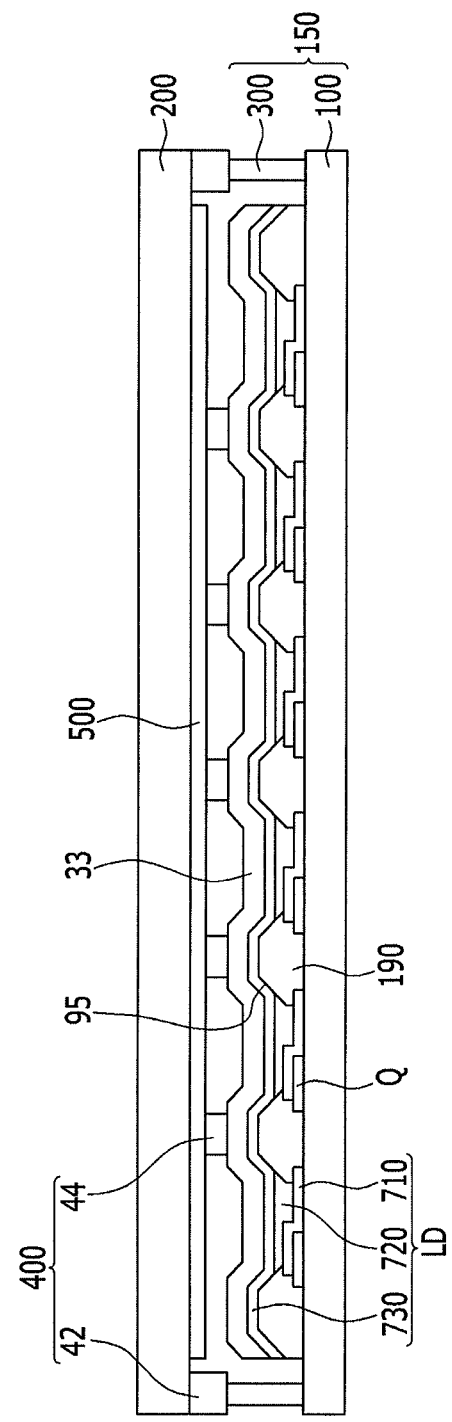
FIG. 2 illustrates a cross-sectional view of FIG. 1 taken along line II-II.

FIG. 1 illustrates a schematic plan view of an organic light emitting display according to an exemplary embodiment, and FIG. 2 illustrates a cross-sectional view of FIG. 1 taken along line II-II.

As illustrated in FIGS. 1 and 2, an organic light emitting display may include a substrate 100, a plurality of pixels P formed on the substrate, a sealant 300 surrounding the pixels P and formed on the substrate 100, a transparent spacer 400 formed on the sealant 300, a touch panel 500 formed on the transparent spacer 400, and encapsulation substrate 200 formed on the touch panel 500.

The substrate 100 and the encapsulation substrate 200 may each be transparent insulating substrate made of glass, quartz, ceramic, or plastic, such as polycarbonate, polyimide, and polyethersulfone. When the substrate 100 and the encapsulation substrate 200 are made of plastic or the like, the substrate 100 and the encapsulation substrate 200 may be transparent flexible substrates having flexibility and elasticity. For example, the organic light emitting display may be foldable, bendable, rollable, and/or stretchable in at least one direction.

Each pixel P may include a thin film transistor Q positioned on the substrate 100, a first electrode 710 connected with the thin film transistor Q, a light emitting layer 720 formed on the first electrode 710, and a second electrode 730 formed on the light emitting layer 720.

A pixel defining layer 190 may be formed on the thin film transistor Q. The pixel defining layer 190 may have an opening 95 exposing the first electrode 710. The light emitting layer 720 of the pixels P may be positioned in the opening 95 of the pixel defining layer 190.

On the substrate 100, a driver 600 that is electrically connected with the pixels P may be formed. The driver 600 may include a driving circuit that controls the pixels. The driving circuit may be integrated on the substrate together with the thin film transistor of the pixel or may be mounted with a driving IC. The driving circuit may receive an external signal through a pad.

Hereinafter, one pixel of the organic light emitting display according to the exemplary embodiment will be described in more detail with reference to the accompanying drawings.

Figure 3:
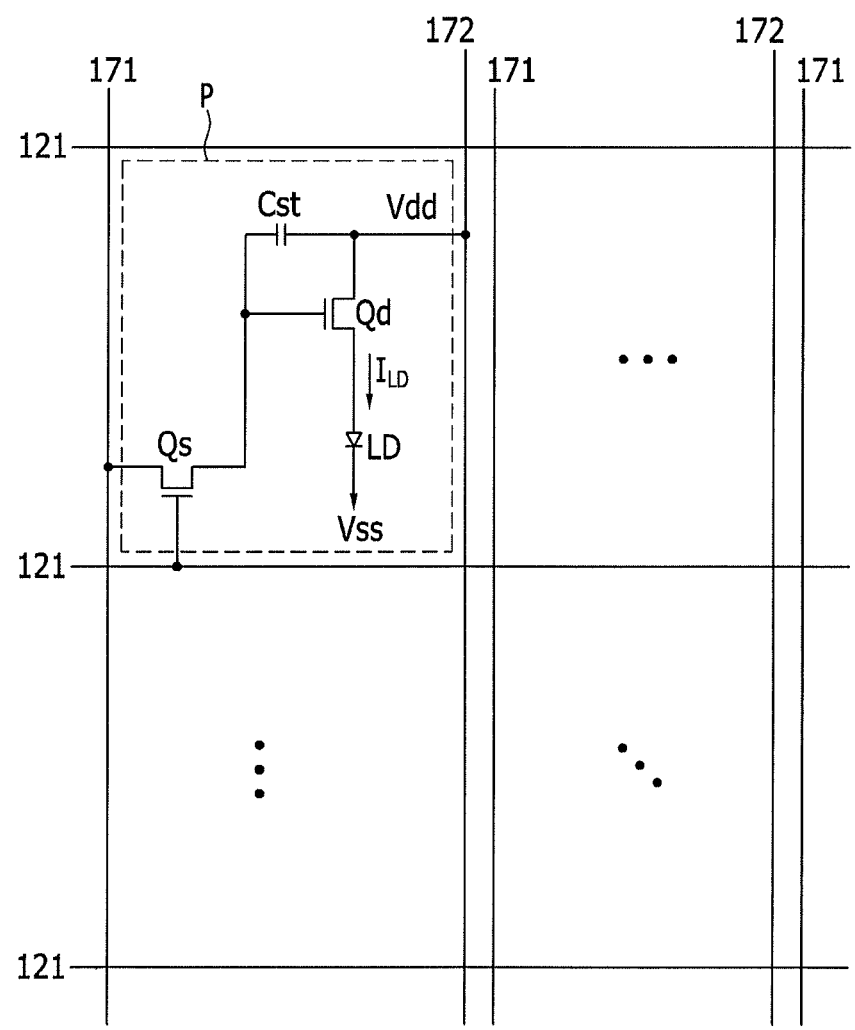
FIG. 3 illustrates an equivalent circuit diagram of one pixel of the organic light emitting display according to the exemplary embodiment.

FIG. 3 illustrates an equivalent circuit diagram of one pixel of the organic light emitting display according to the exemplary embodiment.

As illustrated in FIG. 3, the organic light emitting display according to the exemplary embodiment may include a plurality of signal lines 121, 171, and 172 that are formed on the substrate, and a plurality of pixels P that are connected to the signal lines and arranged substantially in a matrix form.

The signal lines may include a plurality of first signal lines 121 that transfer gate signals (or scanning signals), a plurality of second signal lines 171 that transfer data signals, and a plurality of third signal lines 172 that transfer driving voltages Vdd. The first signal lines 121 may extend substantially in a row direction and may be substantially parallel to each other, and the second signal lines 171 and the third signal lines 172 may cross the first signal lines 121 to extend in a column direction and may be substantially parallel to each other.

Each pixel P may include a driving thin film transistor Qd, a switching thin film transistor Qs, a storage capacitor Cst, and an organic light emitting diode (OLED) LD.

The driving thin film transistor Qd may include a control terminal, an input terminal, and an output terminal. The control terminal may be connected to the switching thin film transistor Qs, the input terminal may be connected to the third signal line 172, and the output terminal may be connected to the OLED LD. The driving thin film transistor Qd may allow an output current $I_{LD}$, an amplitude of which varies according to a voltage applied between the control terminal and the output terminal, to flow.

The switching thin film transistor Qs may also have a control terminal, an input terminal, and an output terminal. The control terminal may be connected to the first signal line 121, the input terminal may be connected to the second signal line 171, and the output terminal may be connected to the driving thin film transistor Qd. The switching thin film transistor Qs may transfer the data signal applied to the second signal line 171 to the driving thin film transistor Qd in response to the scanning signal applied to the first signal line 121.

The storage capacitor Cst may be connected between the control terminal and the input terminal of the driving thin film transistor Qd. The storage capacitor Cst may charge the data signal applied to the control terminal of the driving thin film transistor Qd and may maintain the charged data signal even after the switching thin film transistor Qs is turned off.

The OLED LD may include an anode connected to the output terminal of the driving thin film transistor Qd and a cathode connected to a common voltage Vss. The OLED LD may emit light by varying the intensity according to the output current $I_{LD}$ of the driving thin film transistor Qd to display an image.

Figure 4:
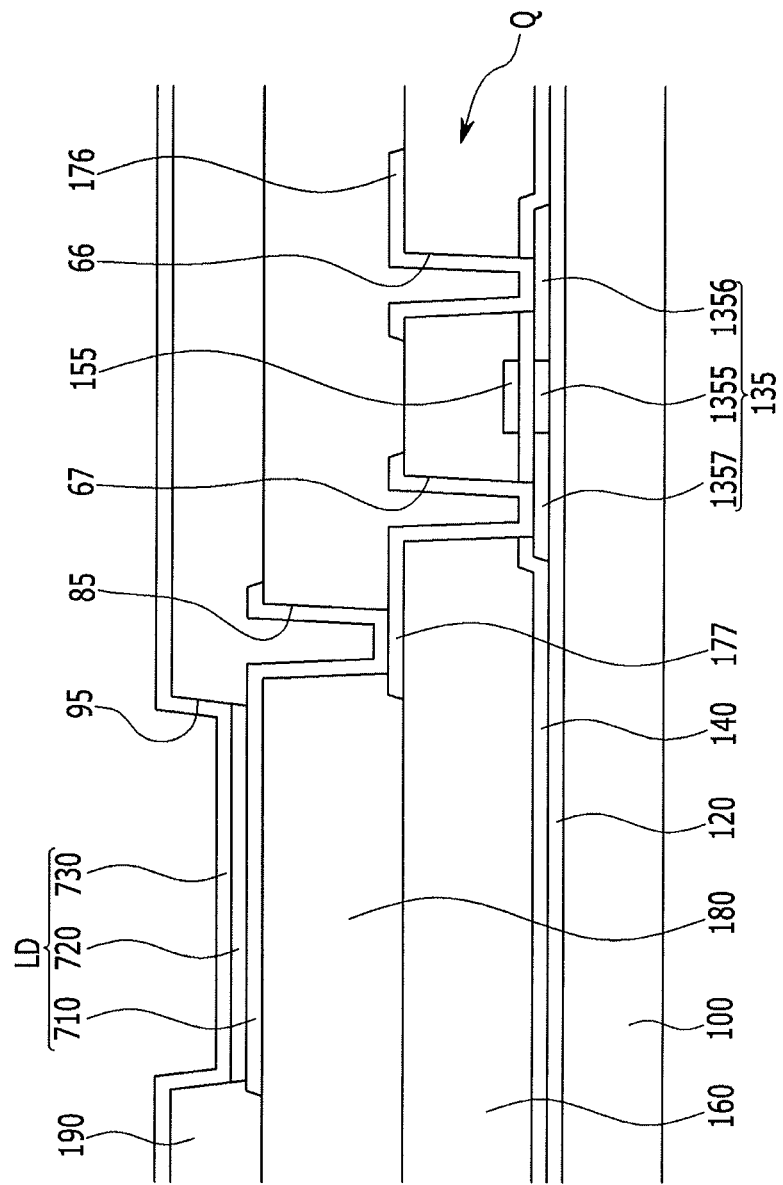
FIG. 4 illustrates a schematic cross-sectional view of a portion of the organic light emitting display according to the exemplary embodiment.

FIG. 4 illustrates a schematic cross-sectional view of a portion of the organic light emitting display according to the exemplary embodiment. (The sealant 300, transparent spacer 400, and touch panel 500 are not shown in FIG. 4.)

The switching thin film transistor and the driving thin film transistor that are included in one pixel have the same layered structure. Accordingly, the driving thin film transistor Qd and the OLED LD will be mainly described in detail according to a laminating sequence, and it is to be understood that the switching thin film transistor may be similar. Hereinafter, the driving thin film transistor Qd of FIG. 3 is referred to as a thin film transistor Q.

As illustrated in FIG. 4, an organic light emitting display may include a substrate 100. A buffer layer 120 may be formed on the substrate 100.

The buffer layer 120 may be formed as a single layer of silicon nitride ($SiN_x$) or as a double-layer structure on which silicon nitride ($SiN_x$) and silicon oxide ($SiO_2$) are laminated. The buffer layer 120 may planarize a surface while preventing unnecessary components such as impurities or moisture from permeating.

A semiconductor 135 made of polycrystalline silicon may be formed on the buffer layer 120.

The semiconductor 135 may be divided into a channel region 1355, and a source region 1356 and a drain region 1357 which are formed at respective sides of the channel region 1355. The channel region 1355 of the semiconductor 135 may be polycrystalline silicon in which impurities are not doped, for example, an intrinsic semiconductor. The source region 1356 and the drain region 1357 may be polycrystalline silicon in which conductive impurities are doped, for example, an impurity semiconductor. The impurities doped in the source region 1356 and the drain region 1357 may be either p-type impurities or n-type impurities.

A gate insulating layer 140 may be formed on the semiconductor 135. The gate insulating layer 140 may be a single layer or a multilayer including at least one of tetra ethyl ortho silicate (TEOS), silicon nitride, and silicon oxide.

A gate electrode 155 may be formed on the semiconductor layer 135. The gate electrode 155 may overlap with the channel region 1355.

The gate electrode 155 may be formed as a single layer or as a multilayer made of a low resistance material such as Al, Ti, Mo, Cu, Ni, or an alloy thereof or a corrosion resistant material.

A first interlayer insulating layer 160 may be formed on the gate electrode 155. The first interlayer insulating layer 160 may be formed as a single layer or as a multilayer made of tetra ethyl ortho silicate (TEOS), silicon nitride, silicon oxide, or the like, similar to the gate insulating layer 140.

A source contact hole 66 and a drain contact hole 67 exposing the source region 1356 and the drain region 1357 may be included in the first interlayer insulating layer 160 and the gate insulating layer 140, respectively.

A source electrode 176 and a drain electrode 177 may be formed on the first interlayer insulating layer 160. The source electrode 176 may be connected with the source region 1356 through the contact hole 66, and the drain electrode 177 may be connected with the drain region 1357 through the contact hole 67.

The source electrode 176 and the drain electrode 177 may be formed as a single layer or as a multilayer made of a low resistance material such as Al, Ti, Mo, Cu, Ni, or an alloy thereof or a corrosion resistant material. For example, the source electrode 176 and the drain electrode 177 may be a triple layer made of Ti/Cu/Ti, Ti/Ag/Ti, or Mo/Al/Mo.

The gate electrode 155, the source electrode 176, and the drain electrode 177 may be a control electrode, an input electrode, and an output electrode of FIG. 3, respectively, to form the thin film transistor together with the semiconductor 135. A channel of the thin film transistor may be formed in the semiconductor 135 between the source electrode 176 and the drain electrode 177.

A second interlayer insulating layer 180 may be formed on the source electrode 176 and the drain electrode 177. The second interlayer insulating layer 180 may include a contact hole 85 exposing the drain electrode 177.

The second interlayer insulating layer 180 may be formed as a single layer or as a multilayer made of tetra ethyl ortho silicate (TEOS), silicon nitride, silicon oxide, or the like, similar to the first interlayer insulating layer 160, or may be made of a low dielectric organic material.

A first electrode 710 may be formed on the second interlayer insulating layer 180. The first electrode 710 may be electrically connected with the drain electrode 177 through the contact hole 85, and may be an anode of the OLED.

In the exemplary embodiment, the interlayer insulating layer may be formed between the first electrode 710 and the drain electrode 177. In other implementations, the first electrode 710 may be formed on the same layer as the drain electrode 177, and may be integrally formed with the drain electrode 177.

A pixel defining layer 190 may be formed on the first electrode 710.

The pixel defining layer 190 may have an opening 95 exposing the first electrode 710. The pixel defining layer 190 may include a resin such as a polyacrylate or a polyimide, a silica-based inorganic material, or the like.

An organic emission layer 720 may be formed in the opening 95 of the pixel defining layer 190.

The organic emission layer 720 may be formed as a multilayer including a light emission layer, and one or more of a hole injection layer (HIL), a hole transporting layer (HTL), an electron transporting layer (ETL), and an electron injection layer (EIL).

In the case where the organic emission layer 720 includes all of the light emitting layer, the HIL, the HTL, the ETL, and the EIL, the HIL may be positioned on the first electrode 710 which may be an anode, and the HTL, the light emitting layer, the ETL, and the EIL may be sequentially laminated thereon.

The light emitting layer may include a red light emitting layer that emits red light, a green light that emits layer emitting green light, and/or a blue light that emits layer emitting blue light. The red light emitting layer, the green light emitting layer, and the blue light emitting layer may be formed as a red pixel, a green pixel, and a blue pixel, respectively, thereby implementing a color image.

In some implementations, the light emitting layer may be simultaneously laminated with the red light emitting layer, the green light emitting layer, and the blue light emitting layer on the red pixel, the green pixel, and the blue pixel and a red color filter, a green color filter, and a blue color filter may be provided for each respective pixel, thereby implementing the colored image. As another example, white light emitting layers that emit white light may be formed on all of the red pixel, the green pixel, and the blue pixel, and a red color filter, a green color filter, and a blue color filter may be formed for each respective pixel, thereby implementing the colored image. In the case of implementing the colored image by using the white light emitting layers and the color filters, a deposition mask for depositing the red light emitting layer, the green light emitting layer, and the blue light emitting layer on the respective pixels red pixel, green pixel, and blue pixel may be omitted.

The white light emitting layer may be formed by one light emitting layer that emits white light, and may emit the white light by laminating light emitting layers that emit different colors of light. For example, the white light emitting layers may include a configuration that may emit white light by combining at least one yellow light emitting layer and at least one blue light emitting layer, a configuration that may emit white light by combining at least one cyan light emitting layer and at least one red light emitting layer, a configuration that may emit white light by combining at least one magenta light emitting layer and at least one green light emitting layer, or the like.

On the pixel defining layer 190 and the organic emission layer 720, the second electrode 730, which is the cathode of FIG. 3, may be formed.

The first electrode 710, the organic emission layer 720, and the second electrode 730 may form an organic light emitting diode LD.

The organic light emitting display may have any one structure of a top display type, a bottom display type, and a both-side display type according to a direction in which the organic light emitting diode LD emits light.

In the case of the top display type, the first electrode 710 may be formed as a reflective layer, and the second electrode 730 may be formed as a transflective layer or a transmissive layer. In the case of the bottom display type, the first electrode 710 may be formed as a transflective layer and the second electrode 730 may be formed as a reflective layer. In the case of a both-side display type, the first electrode 710 and the second electrode 730 may be formed as a transparent layer or a translucent layer.

A reflective layer and a translucent layer may be formed by using one or more metals of magnesium (Mg), silver (Ag), gold (Au), calcium (Ca), lithium (Li), chromium (Cr), and aluminum (Al), or an alloy thereof. The reflective layer and the transflective layer may be determined by a thickness. The transflective layer may be formed with a thickness of 200 nm or less. As the thickness is decreased, transmittance of light is increased, but when the thickness is very small, the resistance may be increased.

The transparent layer may be made of a material such as indium tin oxide (ITO), indium zinc oxide (IZO), zinc oxide (ZnO), indium oxide ($In_2O_3$) or the like.

Referring back to FIGS. 1 and 2, a capping layer 33 may be formed on the second electrode 730. The capping layer 33 may be an insulating material made of an organic material to protect the surface of the second electrode 730.

The transparent spacer 400 may include a first spacer 42, which is positioned in a peripheral area TB and formed to surround the display area TA, and a second spacer 44 which is positioned in a display area TA. The first spacer 42 may overlap with the sealant 300.

The substrate 100 and the encapsulation substrate 200 may be attached to each other such that the display area TA is sealed by the transparent spacer 400 and the sealant 300.

The second spacer 44 may be positioned between the pixels P. The second spacer 44 may have a column shape. A transverse section of the second spacer 44 may be, for example, a circle as illustrated in FIG. 1. In other implementations, the transverse section may be a polygon such as a triangle and a quadrangle. The second spacer 44 may overlap with the pixel defining layer 190 so as not to overlap with the light emitting layer of the pixel.

The transparent spacer 400 may include at least one of, for example, PbO, SnO, $V_2O_5$, $P_2O_5$, BaO, ZnO, $B_2O_3$, and $Bi_2O_3$, as a transparent insulating material having transmittance of 85% or more. The transparent spacer 400 may have a thickness of, for example, 1 μm to 100 μm. When the thickness of the transparent spacer 400 is greater than 1 μm, a deterioration of sensing characteristic of the touch panel due to a parasitic capacitance because a short distance between the touch panel and the pixel may be avoided. When the thickness is less than 100 μm, an increase in the thickness of the organic light emitting display may be minimized.

The transparent spacer 400 may be formed by using screen printing, a lamination process, a photolithography process, or the like.

The touch panel may include a touch sensor. The touch sensor may sense a touch position when the external object is contacted or approached.

Figure 5:
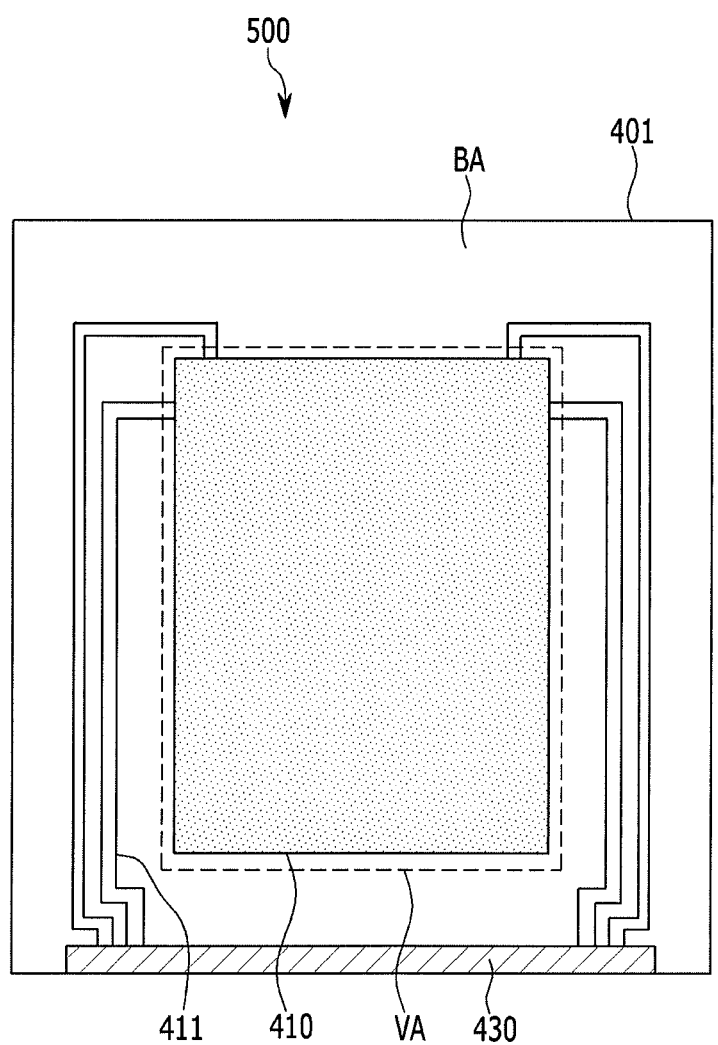
FIG. 5 illustrates a schematic plan view of a touch panel according to the exemplary embodiment.

FIG. 5 illustrates a schematic plan view of a touch panel according to the exemplary embodiment.

As illustrated in FIG. 5, a touch panel 500 according to the present disclosure may include a touch sensor 410 formed on a touch substrate 401. The touch sensor 410 may be a suitable type of touch sensor, for example, a capacitive type touch sensor. The touch sensor may include a plurality of touch electrodes formed on at least one layer.

The touch sensor may include a metal oxide such as ITO or IZO, metal nanowire, conductive polymer, metal mesh, or a transparent conductive material such as a thin metal layer.

In the case where the touch sensor is the capacitive type, the touch electrode of the touch sensor may receive a sensing input signal from a driver and may generate a sensing output signal that varies according to a contact to transmit the sensing output signal to the driver.

When the touch electrode forms a self sensing capacitor together with the external object, after the touch electrode receives the sensing input signal and then is charged with a predetermined charging amount, when the external object such as a finger is contacted, the predetermined charging amount charged in the self sensing capacitor is changed and thus a sensing output signal different from the inputted sensing input signal may be output. As such, touch information such as existence of the touch and a touch position may be determined through the changed sensing output signal.

In the case of forming a mutual sensing capacitor up to adjacent touch electrodes, one touch electrode receives the sensing input signal from the driver and thus the mutual sensing capacitor may be charged to a predetermined charging amount. Thereafter, when the external object such as a finger is contacted, the predetermined charging amount charged in the mutual sensing capacitor is changed and the changed charging amount may be output as the sensing output signal. Touch information such as whether the contact exists and the contact position may be determined through the changed sensing output signal.

The plurality of touch electrodes may be positioned on the same layer or may also be positioned on different layers. The touch electrodes positioned on the different layers may also be positioned on different surfaces of one substrate, or positioned on different layers on the same surface of the substrate.

The plurality of touch electrodes may be connected to a pad part 430 through a plurality of signal wires 411. The signal wires may input an input signal to the touch electrode or output an output signal to the driver through pad part. The pad part may be connected with a driving circuit chip or a driver having a form of a circuit board or a circuit film. A peripheral area of the touch area VA may be positioned in the peripheral area BA. The pad part may be positioned below any one side of the peripheral area BA, for example, the illustrated touch area VA. In this case, the pad part of the touch substrate may be disposed to correspond to the pad part of the substrate.

The signal wires may be positioned in the peripheral area BA. In some implementations, the signal wires may also be positioned in the touch area VA.

Hereinabove, it is illustrated that the touch sensor 410 is formed on the touch substrate 401. In other implementations, the touch sensor may be directly formed on the encapsulation substrate 200.

The transparent spacer 400 may be formed to maintain a predetermined gap between the touch panel 500 and the display panel 150 including pixels P. Accordingly, a deterioration of sensing sensitivity deteriorating due to the parasitic capacitance generated between the second electrode 730 of the pixel and the touch sensor 410 may be reduced or prevented.

Further, in the present disclosure, since the touch panel 500 may be sealed between the encapsulation substrate 200 and the display panel 150. In a slimness process for reducing a thickness of the encapsulation substrate 200, the touch panel may not exposed. Accordingly, the slimness process may be performed without having to consider a possibility that the touch panel 500 could be damaged during the process. Thereby, the slimness process may be easily performed.

Hereinafter, a method of forming the display device illustrated in FIGS. 1 to 5 will be described in detail with reference to FIG. 6 in addition to FIGS. 1 to 4 described above.

Figure 6:
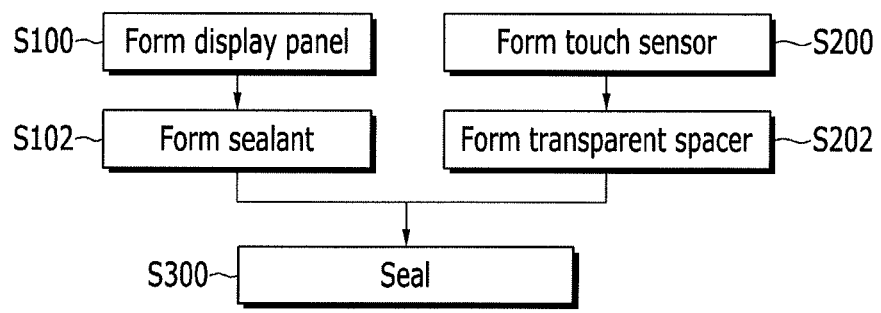
FIG. 6 illustrates a flowchart for manufacturing an organic light emitting display according to an exemplary embodiment.

FIG. 6 illustrates a flowchart for manufacturing an organic light emitting display according to an exemplary embodiment.

As illustrated in FIG. 6, forming the organic light emitting display may include forming a display panel including a thin film transistor and an organic light emitting diode on a substrate (S100), forming a sealant on the display substrate (S102), forming a touch sensor on an encapsulation substrate (S200), forming a transparent spacer on the touch sensor and the encapsulation substrate (S202), and arranging, pressing, and sealing the encapsulation substrate and the display substrate so as to face each other (S300).

In forming the display panel (S100), forming the thin film transistor and the organic light emitting diode may include forming the pixels illustrated in FIGS. 3 and 4 on the substrate 100.

In forming the sealant 300 (S102), the sealant may be formed to surround the pixel area by using a frit or the like as sealant material. The sealant may be formed in a viscous and flowable state.

In forming the touch sensor 410 (S200), a metal layer may be directly formed on the encapsulation substrate 200 and then patterned to form the touch sensor including the touch electrode. In some implementations, the touch sensor may be formed on a separate touch substrate and then may be attached onto the encapsulation substrate by using an adhesive or the like.

In forming the transparent spacer 400 (S202), after a transparent insulating layer is formed on the touch panel or the encapsulation substrate, the transparent spacer 400 may be formed by a photolithography process using a photosensitive film pattern. In some implementations, a transparent material may be formed by printing using a screen mask in a paste state. When the transparent material is formed in the paste state, a curing process using heat treatment may be added after printing.

The transparent spacer 400 may be formed with a thickness of 1 μm to 100 μm. The transparent insulating material may be made of at least one of PbO, SnO, $V_2O_5$, $P_2O_5$, BaO, ZnO, $B_2O_3$, and $Bi_2O_3$.

In the sealing (S300), the encapsulation substrate 200 and the display panel 150 may be arranged to face each other. The transparent spacer 400 and the sealant 300 may be arranged to contact each other, Thereafter, while predetermined pressure is applied, the sealant 300 may be heat-treated and cured by using a laser. The laser may pass through the transparent spacer, and the sealant 300 may be easily cured by using the laser.

Figure 7:
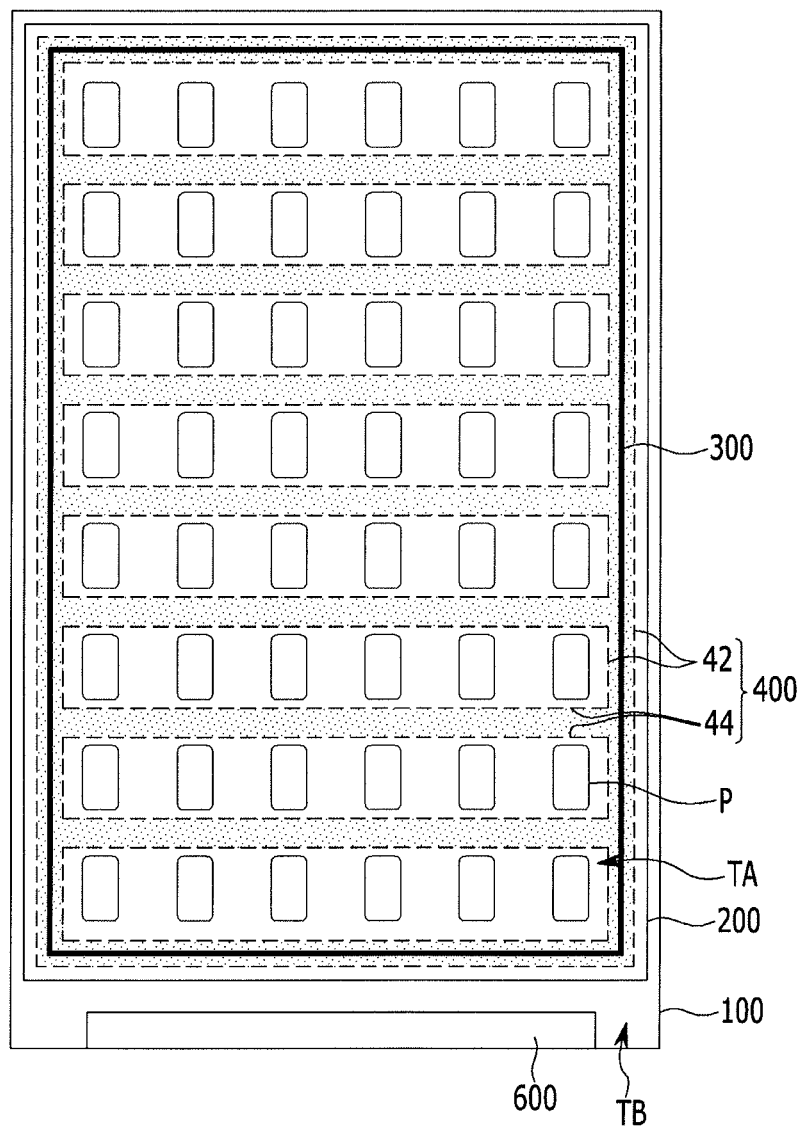
FIGS. 7 and 8 illustrate schematic plan views of a display device according to other exemplary embodiments.
Figure 8:
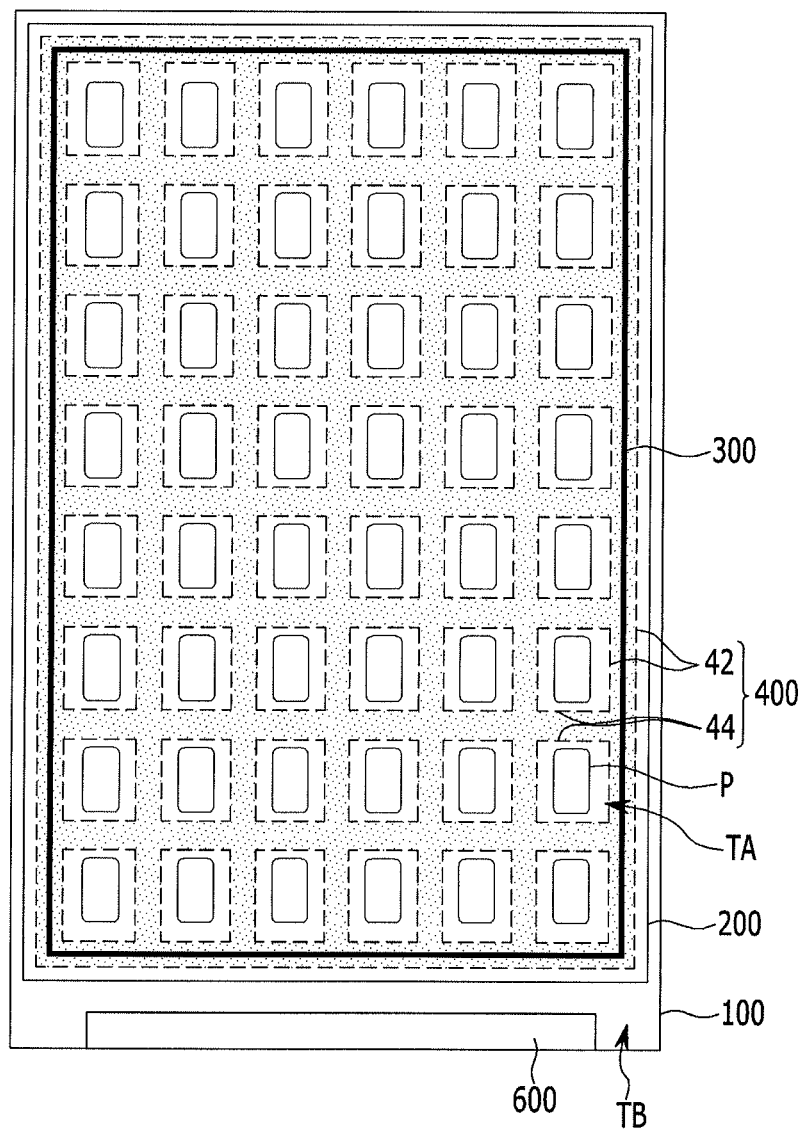

FIGS. 7 and 8 illustrate schematic plan views of a display device according other exemplary embodiments.

The configuration of the display device of FIGS. 7 and 8 is similar to that of the organic light emitting display illustrated in FIG. 1. Features that differ from FIG. 1 will be described in detail.

As illustrated in FIGS. 7 and 8, a display device may include a substrate 100, a plurality of pixels P formed on the substrate, a sealant 300 surrounding a display area with the pixels P and formed on the substrate 100, a transparent spacer 400 formed on the sealant 300, a touch panel formed on the transparent spacer 400, and an encapsulation substrate 200 formed on the touch panel.

The transparent spacer 400 of FIGS. 7 and 8 may include a first spacer 42 that corresponds to the sealant 300 and is formed in a peripheral area TB to surround the pixel area, and a second spacer 44 formed in the display area TA with the pixels.

The second spacer 44 may be positioned between the pixels and may have a linear shape elongated in one direction. According to the embodiment illustrated in FIG. 7, second spacer 44 may be positioned between pixel rows and elongated along the pixel row.

According to the embodiment illustrated in FIG. 8, the second spacers 44 may be positioned between the pixel rows and between pixel columns, and may be elongated along the pixel row and the pixel column. Accordingly, the second spacer 44 may have a grid shape.

Figure 9:
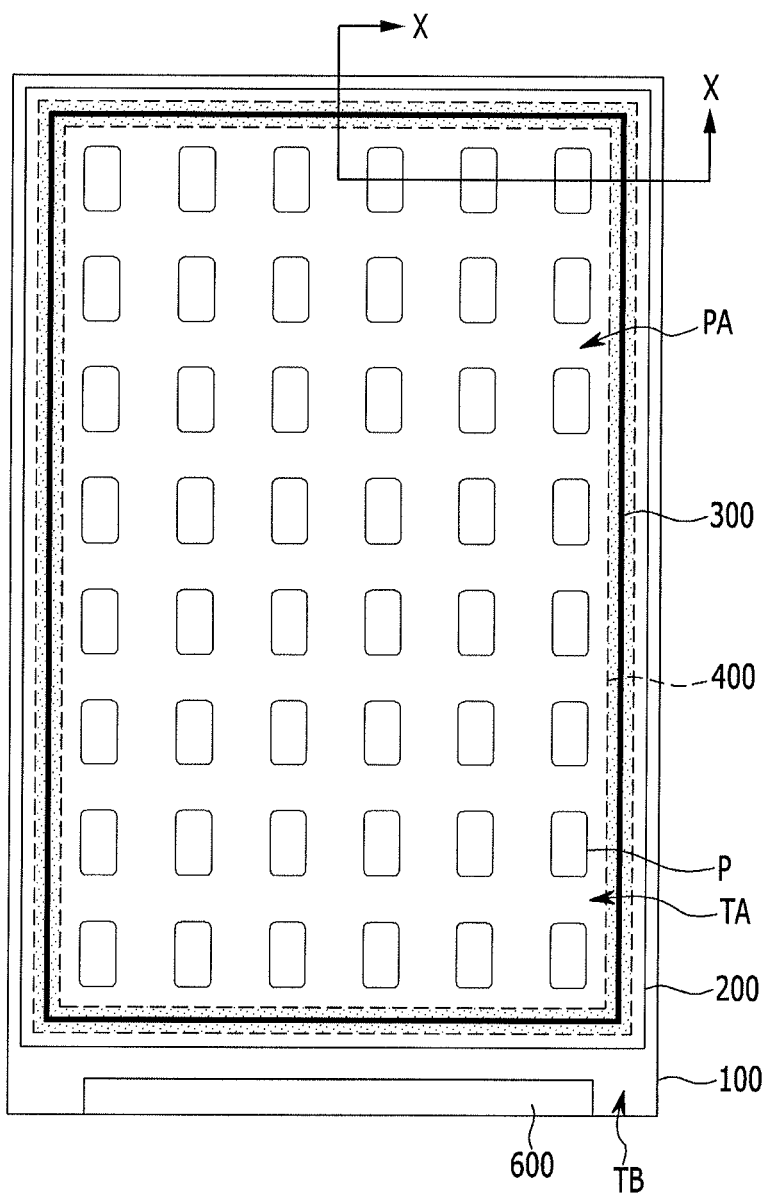
FIG. 9 illustrates a schematic plan view of a display device according to another exemplary embodiment.

FIG. 9 illustrates a schematic plan view of a display device according to another exemplary embodiment, and FIG. 10 illustrates a cross-sectional view of FIG. 9 taken along line X-X.

As illustrated in FIGS. 9 and 10, the display device may include a substrate 100, a plurality of pixels P formed on the substrate, a sealant 300 surrounding a display area TA with the pixels P and formed on the substrate 100, a transparent spacer 400 formed on the sealant 300, a touch panel 500 formed on the transparent spacer 400, and an encapsulation substrate 200 formed on the touch panel 500.

The transparent spacer 400 illustrated in FIGS. 9 and 10 may be formed on the entire surface of the encapsulation substrate or the touch panel to correspond to the entire display area TA. Accordingly, the transparent spacer 400 of FIGS. 7 and 8 does not require a separate patterning process.

By way of summation and review, a touch sensing function determines contact information, such as whether an object approaches or contacts a screen and a contact position thereof, by sensing a change in pressure, charges, light, and the like which are applied onto the screen by the display device, for example, when a user writes something or draws a figure by approaching or contacting the screen with a finger or a touch pen. The display device may receive an image signal based on the contact information to display an image.

The touch sensing function may be implemented by a touch sensor. The touch sensor may be classified according to various touch sensing types such as a resistive type, a capacitive type, an electromagnetic resonance (EMR) type, or an optical type.

In the case of the resistive type touch sensor, two electrodes spaced apart from each other while facing each other may contact each other by pressure of an external object. When two electrodes contact each other, a change in voltage according to a resistance change at the contact position may be recognized to determine the contact position or the like.

For example, the capacitive type touch sensor may include a sensing capacitor configured by a sensing electrode capable of transferring the sensing signal, and may determine whether there is a contact, a contact position, or the like by sensing a change in capacitance of the sensing capacitor generated when a conductor such as a finger approaches the sensor. The capacitive type touch sensor may sense the touch only when a user touches a touch screen and may require a contact by a conductive object.

The touch sensor may be built in the display device (in-cell type) or formed on an outer surface of the display device (on-cell type).

However, in the case where the touch sensor is built in the display device, instead of being formed on the outer surface, sensing sensitivity of the touch sensor may deteriorate according to a parasitic capacitance due to a driving signal of the display device Embodiments advance the art by providing a display device having advantages of preventing a deterioration of sensing sensitivity due to a parasitic capacitance even though a touch sensor is built in the display device. According to embodiments, when a transparent spacer is formed, a touch electrode and a display substrate have a predetermined gap to minimize generation of a parasitic capacitance due to a driving circuit of the display substrate. Therefore, it is possible to provide a high-quality display device by preventing sensing sensitivity from deteriorating due to the parasitic capacitance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof the present invention as set forth in the following claims.

What is claimed is:

1. A display device, comprising:
    a substrate having a display area including a plurality of pixels and a peripheral area positioned outside the display area, wherein the pixels each include:
        a transistor,
        a first electrode connected with the transistor,
        an organic emission layer on the first electrode, and
        a second electrode on the organic emission layer;
    a sealant on the substrate in the peripheral area;

a first spacer on the sealant, the first spacer being made of a transparent insulating material;

an encapsulation substrate on the first spacer, the transparent insulating material of the first spacer being between the sealant and the encapsulation substrate;

a touch-panel including touch sensors on the encapsulation substrate facing the display area; and a plurality of second spacers between the touch-panel and the second electrode, wherein each second spacer is made of the transparent insulating material.

2. The display device as claimed in claim 1, wherein:
the first spacer is on the entire substrate.

3. The display device as claimed in claim 1, wherein:
the transparent insulating material includes PbO, SnO, $V_2O_5$, $P_2O_5$, BaO, ZnO, $B_2O_3$, or $Bi_2O_3$.

4. The display device as claimed in claim 1, further comprising a pixel defining layer formed on the substrate and having an opening exposing the first electrode, wherein the second spacer is positioned in a region corresponding to the pixel defining layer.

5. The display device as claimed in claim 4, wherein:
the second spacer has a column shape.

6. The display device as claimed in claim 4, wherein:
the pixels are provided in a matrix form, and
the second spacer is provided along at least one of the pixel row and the pixel column to have a linear shape.

7. The display device as claimed in claim 1, wherein:
the touch sensor is a capacitive type touch sensor.

* * * * *